(12) United States Patent
Shi et al.

(10) Patent No.: US 12,459,725 B2
(45) Date of Patent: Nov. 4, 2025

(54) PAINTING ASSEMBLY FOR DISTANCE MEASURING WHEEL

(71) Applicant: NORTHWEST INSTRUMENT INC., Dover, NJ (US)

(72) Inventors: Xin Shi, Shanghai (CN); Kui Liu, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 322 days.

(21) Appl. No.: 18/148,795

(22) Filed: Dec. 30, 2022

(65) Prior Publication Data

US 2023/0132762 A1 May 4, 2023

Related U.S. Application Data

(63) Continuation of application No. PCT/CN2021/104661, filed on Jul. 6, 2021.

(30) Foreign Application Priority Data

Nov. 5, 2020 (CN) .......................... 202011222604.2

(51) Int. Cl.
 *G01B 3/12* (2006.01)
 *B65D 83/26* (2006.01)
 *G01C 15/04* (2006.01)
(52) U.S. Cl.
 CPC ............. *B65D 83/26* (2013.01); *G01C 15/04* (2013.01)
(58) Field of Classification Search
 CPC ........... G01B 3/12; G01C 15/04; B65D 83/26
 (Continued)

(56) References Cited

U.S. PATENT DOCUMENTS 5,749,522 A * 5/1998 Smrt .................... B65D 83/184
 239/150
5,829,147 A * 11/1998 Kousek ................ G01C 15/004
 33/666

(Continued)

FOREIGN PATENT DOCUMENTS

AU 2018211005 A1 8/2019
CN 104634222 A 5/2015
(Continued)

OTHER PUBLICATIONS

The World Intellectual Property Organization (WIPO) International Search Report for PCT/CN2021/104661 Sep. 30, 2021 8 Pages (including translation).

(Continued)

*Primary Examiner* — George B Bennett
(74) *Attorney, Agent, or Firm* — Anova Law Group, PLLC

(57) ABSTRACT

A painting assembly for a distance measuring wheel includes: a main body; a connecting device disposed on the main body and configured to connect the paining assembly to an arm member of the distance measuring wheel; a paint can fixing device disposed on the main body and configured to fix a paint can installed to the painting assembly; a communication device configured to receive a control signal for controlling a driving device; and the driving device connected to the main body and configured to: in response to the control signal, control a paint spraying state of the paint can.

20 Claims, 12 Drawing Sheets

(58) Field of Classification Search
USPC .................................................. 33/772–782
See application file for complete search history.

(56) References Cited

U.S. PATENT DOCUMENTS

| | | | | |
|---|---|---|---|---|
| 7,905,025 | B1* | 3/2011 | Andersen | B25H 7/045 |
| | | | | 33/772 |
| 9,803,965 | B2* | 10/2017 | Thorp | G01B 3/12 |
| 12,055,414 | B2* | 8/2024 | Shi | G01B 3/12 |
| 12,111,151 | B1* | 10/2024 | Shi | G01B 5/004 |
| 2007/0272715 | A1 | 11/2007 | Sassoon | |
| 2008/0256817 | A1* | 10/2008 | Watkins | G01B 3/12 |
| | | | | 33/779 |
| 2009/0064527 | A1 | 3/2009 | Weavers et al. | |
| 2009/0217542 | A1 | 9/2009 | Watkins | |
| 2010/0189887 | A1 | 7/2010 | Nielsen et al. | |
| 2011/0180626 | A1* | 7/2011 | Kang | B65D 83/184 |
| | | | | 138/155 |
| 2015/0056369 | A1 | 2/2015 | Kohn | |
| 2018/0128588 | A1 | 5/2018 | Shi et al. | |
| 2023/0043567 | A1* | 2/2023 | Copeland | A61L 9/04 |

FOREIGN PATENT DOCUMENTS

| | | |
|---|---|---|
| CN | 204996604 U | 1/2016 |
| CN | 205462866 U | 8/2016 |
| CN | 105921328 A | 9/2016 |
| CN | 107156089 A | 9/2017 |
| CN | 207210927 U | 4/2018 |
| CN | 207710773 U | 8/2018 |
| CN | 208328642 U | 1/2019 |
| CN | 109862085 A | 6/2019 |
| CN | 208936919 U | 6/2019 |
| CN | 110332641 A | 10/2019 |
| CN | 110994412 A | 4/2020 |
| CN | 111576176 A | 8/2020 |
| CN | 111721769 A | 9/2020 |
| CN | 112221782 A | 1/2021 |
| CN | 112371381 A | 2/2021 |
| CN | 213762475 U | 7/2021 |
| IN | 201596587 U | 10/2010 |
| IN | 202485679 U | 10/2012 |
| WO | 2007025063 A2 | 3/2007 |

OTHER PUBLICATIONS

The European Patent Office (EPO) Search Report for EP Application No. 21888192.2 4 Pages.
The Australian National Intellectual Property Office The Examination report No. 1 for Application 2021376711 May 13, 2024 4 Pages.
The Australian National Intellectual Property Office The Examination report No. 1 for Application 2021375548 Jul. 12, 2024 7 Pages.

* cited by examiner

PAINTING ASSEMBLY FOR DISTANCE MEASURING WHEEL

CROSS-REFERENCES TO RELATED APPLICATIONS

This application is a continuation application of International Application No. PCT/CN2021/104661, filed on Jul. 6, 2021, which claims priority to Chinese Patent Application No. 202011222604.2, filed with the China National Intellectual Property Administration (CNIPA) on Nov. 5, 2020, the entire contents of both of which are incorporated herein by reference.

TECHNICAL FIELD

The present disclosure relates to the technical field of surveying and mapping technologies and, more particularly, to a painting assembly for a distance measuring wheel.

BACKGROUND

The existing distance measuring wheels often do not have a painting function. Even if they have the painting function, the painting function is realized by a mechanical mechanism, that is, the painting function can only be controlled manually. As such, the painting function is error prone, and only supports spraying simple lines or patterns. However, the painting function is unable to support spraying high precision and complex patterns.

SUMMARY

One aspect of the present disclosure provides a painting assembly for a distance measuring wheel. The painting assembly includes: a main body; a connecting device disposed on the main body and configured to connect the paining assembly to an arm member of the distance measuring wheel; a paint can fixing device disposed on the main body and configured to fix a paint can installed to the painting assembly; a communication device configured to receive a control signal for controlling a driving device; and the driving device connected to the main body and configured to: in response to the control signal, control a paint spraying state of the paint can.

By introducing the painting assembly coupled with the distance measuring wheel, the control signal received through the communication device controls the driving device. The driving device controls the paint spraying state of the paint can connected to the paint can fixing device, thereby facilitating paint spraying predetermined patterns.

In some embodiments, a nozzle of the paint can is aligned with a center line of a wheel member of the distance measuring wheel coupled with the painting assembly. As such, a route sprayed by the painting assembly is consistent with a route of the distance measuring wheel attached thereto, such that the route sprayed by the painting assembly can be planned according to a travel route of the distance measuring wheel. In some embodiments, the nozzle of the paint can is located in a same plane as a radial direction of the wheel member of the distance measuring wheel.

In some embodiments, the painting assembly further includes a transmission member mechanically coupled with the nozzle of the paint can, configured to rotate to different positions when driven by the driving device, wherein a position of the transmission member correspond to an opening extent of the nozzle. In addition, the transmission member includes a flywheel or a concave cam. The flywheel or the concave cam is configured on a driving shaft of the driving device to mechanically couple with the nozzle of the paint can connected to the paint can fixing device, such that the rotation angle of the flywheel or the concave cam corresponds to the opening extent of the nozzle. In this way, the rotation angle of the flywheel or the concave cam is made to correspond to the opening extent of the nozzle, such that the flywheel or the concave cam is driven to rotate the rotation angle by the driving device, thereby controlling the extent of opening the paint can connected to the paint can fixing device to control an amount of the paint sprayed and determining a thickness of the paint sprayed.

In some embodiments, the transmission member at a first position corresponds to a closed position of the nozzle. In some embodiments, the transmission member at a second position corresponds to a maximum opening position of the nozzle, the second position being different from the first position. In some embodiments, the transmission member at a position between the first position and the second position corresponds to an opening extent of the nozzle smaller than the maximum opening position of nozzle. In this way, it is possible to select or set the rotation angle of the transmission member according to the amount of the paint sprayed, such that the rotation angle is within a range between the closed position and the maximum opening position, thereby controlling a required amount of the paint sprayed. IN some embodiments, the transmission member includes a concave cam or a flywheel.

In some embodiments, the connecting device includes an upper buckle and a lower buckle. The upper buckle and the lower buckle are disposed on the main body and configured to fixedly connect the painting assembly to the arm member of the distance measuring wheel. In this way, the painting assembly is easily and quickly assembled and disassembled with the distance measuring wheel. In other words, by toggling the upper buckle and the lower buckle, the painting assembly is fixedly connected to the arm member of the distance measuring wheel or disassembled from the arm member of the distance measuring wheel.

In some embodiments, the upper buckle and/or the lower buckle include one or more metal pins. The driving device is electrically connected to the distance measuring wheel through the one or more metal pins, such that the distance measuring wheel supplies power to the driving device through the one or more metal pins. As such, the upper buckle and/or the lower buckle include the one or more metal pins. The driving device is electrically connected to the distance measuring wheel through the metal pins, such that the distance measuring wheel supplies power to the driving device through the one or more metal pins. In this way, on one hand, the distance measuring wheel supplies power to the driving device through the one or more metal pins, that is, the painting assembly operates without an additional power supply module. On the other hand, in some embodiments, the communication device includes the one or more metal pins configured to facilitate the paining assembly coupled with the distance measuring wheel to control the rotation angle rotated by the driving device.

In some embodiments, the communication device is a Bluetooth communication module. Those skilled in the art should understand that the Bluetooth communication module is merely exemplary and non-restrictive. Other modules capable of short-range wireless communication may also solve the technical problems that the disclosure intends to solve and achieve corresponding technical effects. For example, the other modules may include wireless communication modules such as a ZigBee communication module, an infrared communication module, a 315/433/868/915 MHz wireless communication module, and so on.

In some embodiments, the painting assembly includes an independent power supply device thereof. In this way, the painting assembly does not have to rely on the distance measuring wheel for power supply. Instead, the painting assembly may include a separate and independent power supply device, thereby securing the power supply of the painting assembly.

Another aspect of the present disclosure provides a distance measuring wheel having a paint spraying function. The distance measuring wheel includes a connecting device disposed on the main body and configured to connect the paining assembly to an arm member of the distance measuring wheel; a paint can fixing device disposed on the main body and configured to fix a paint can installed to the painting assembly; a communication device configured to receive a control signal for controlling a driving device; and the driving device connected to the main body and configured to: in response to the control signal, control a paint spraying state of the paint can.

In some embodiments, the distance measuring wheel further includes a communication module configured to send a control signal to the painting assembly. The distance measuring wheel provided by the present disclosure includes the communication module that sends the control signal to the painting assembly, such that the distance measuring wheel controls the amount of the paint sprayed by the painting assembly.

In some embodiments, the distance measuring wheel further includes an image acquisition device. In this way, the distance measuring wheel includes the image acquisition device, such that the distance measuring wheel acquires images such as real scenes and enables subsequent guidance of painting by, for example, augmented reality (AR).

In some embodiments, the distance measuring wheel further includes a display device. In such a manner, the distance measuring wheel may, for example, display the required paint pattern in real time, and may also display a combination of the real scene and the paint pattern.

By introducing the painting assembly coupled with the distance measuring wheel, the control signal received through the communication device controls the driving device. The driving device controls the paint spraying state of the paint can connected to the paint can fixing device, thereby facilitating paint spraying predetermined patterns.

BRIEF DESCRIPTION OF THE DRAWINGS

The embodiments of the present disclosure are described in detail below with reference to the accompanying drawings. The drawings serve to clarify the basic principles and thus only show the necessary aspects for understanding the basic principles. The drawings are not necessarily drawn to scale, and components with similar properties or characteristics may have the same or similar reference numerals.

Other features, characteristics, advantages, and benefits of the present disclosure will become more apparent from the following detailed description with reference to the accompanying drawings.

DETAILED DESCRIPTION OF THE EMBODIMENTS

References are made to the accompanying drawings which form a part of the disclosure. The accompanying drawings show with examples how certain embodiments of the present disclosure may be practiced. The illustrated embodiments are not intended to be exhaustive of all embodiments according to the present disclosure. It should be understood that other embodiments may be utilized and structural or logical changes may be made without departing from the scope of the present disclosure. Accordingly, the following detailed description is not limiting, and the scope of the present disclosure is defined by the appended claims.

The following technical problems are present in the existing technology, that is, in the existing technology, either the distance measuring wheel cannot spray paint or paint sprayed by the distance measuring wheel cannot be accurately controlled, thereby incapable of spraying complex patterns.

Figure 1:
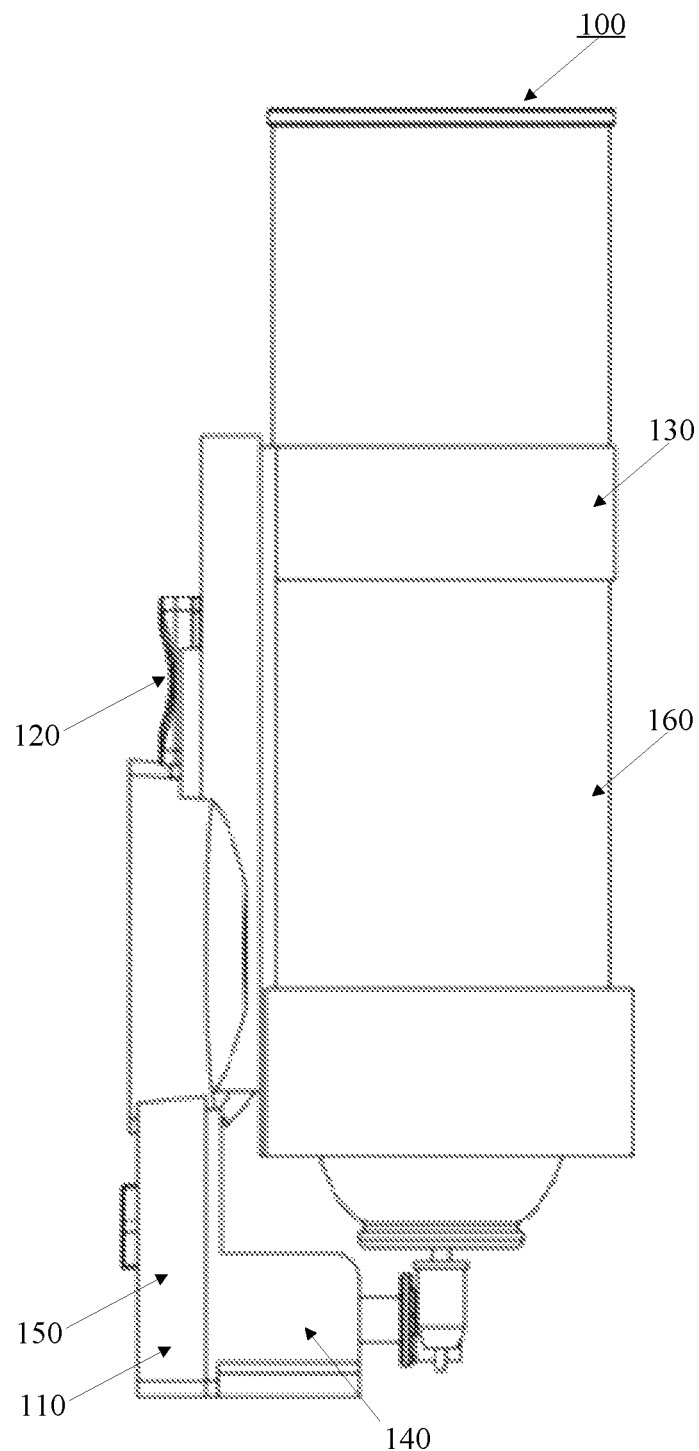
FIG. 1 is a front view of an exemplary painting assembly 100 for a distance measuring wheel according to some embodiments of the present disclosure.

In view of the above technical problems, the present disclosure provides a painting assembly for a distance measuring wheel. FIG. 1 is a front view of an exemplary painting assembly 100 for a distance measuring wheel according to some embodiments of the present disclosure. As shown in FIG. 1, the painting assembly 100 includes a main body 110, a connecting device 120, a paint can fixing device 130, a driving device 140, and a communication device 150. The communication device 150 may be a wired communication device or a wireless communication device, and may be arranged at any position of the painting assembly 100 for the distance measuring wheel. The connecting device 120 is disposed on the main body 110 and is configured to connect the painting assembly 100 to an arm member of the distance measuring wheel (not shown in FIG. 1, but will be shown in FIG. 7). The paint can fixing device 130 is disposed on the main body 110 and is configured to fix a paint can 160 that is installed on the painting assembly 100. The driving device 140 is connected to the main body 110. The communication device 150 is configured to receive a control signal for controlling the driving device, to control a paint spraying state of the paint can 160 connected to the paint can fixing device 130. By introducing the painting assembly 100 for the distance measuring wheel, the driving device 140 can be controlled by the control signal received through the communication device 150, and then the paint spraying state of the paint can 160 can be controlled. This will make it possible to paint a predetermined pattern.

Figure 2:
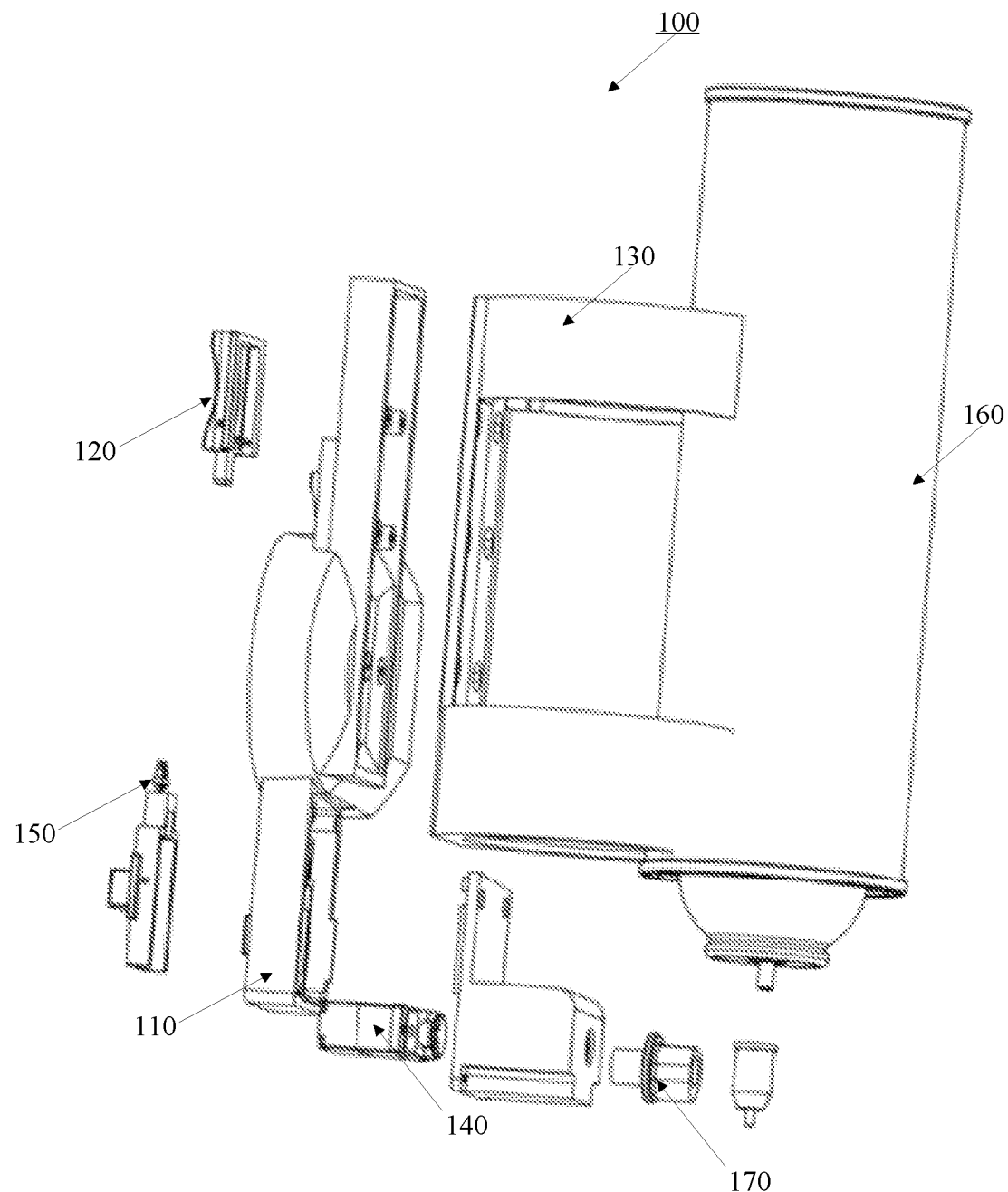
FIG. 2 is an exploded view of an exemplary painting assembly 100 for a distance measuring wheel according to some embodiments of the present disclosure.

FIG. 2 is an exploded view of an exemplary painting assembly 100 for a distance measuring wheel according to some embodiments of the present disclosure. As shown in FIG. 2, the painting assembly 100 includes the main body 110, the connecting device 120, the paint can fixing device 130, the driving device 140, the communication device 150, and a concave cam 170. The communication device 150 may include a wired interface or a wireless interface, and may be arranged at any position of the painting assembly 100 for the distance measuring wheel. As shown in FIG. 2, the communication device 150 may be, for example, a shrapnel, a connector, or a metal pin, that is, for receiving a control signal through the wired interface. The connecting device 120 is configured on the main body portion 110 to connect the painting assembly 100 to the arm member of the distance measuring wheel (not shown in FIG. 1, but will be shown in FIG. 7). The connecting device 120 may be, for example, a pogo pin connector. The paint can fixing device 130 is configured on the main body 110 to fix the paint can 160 installed on the painting assembly 100. The paint can 160 may be pre-installed on the painting assembly at the factory, or may also be purchased by a user at a later stage to adapt to the painting assembly 100. The driving device 140 is connected to the main body 110. The communication device 150 is configured to receive a control signal for controlling the driving device 140 to control the paint spraying state of the paint can 160 130. By introducing the painting assembly 100 for the distance measuring wheel, the driving device 140 may be controlled by the control signal received through the communication device 150, and then the paint spraying state of the paint can 160 may be controlled, thereby facilitating to paint a predetermined pattern.

In some embodiments, the connecting device 120 includes an upper buckle and a lower buckle. The upper buckle and the lower buckle are disposed on the main body 110 and configured to fixedly connect the painting assembly to the arm member of the distance measuring wheel. In this way, the painting assembly 100 may be easily and quickly assembled and disassembled with the distance measuring wheel. In other words, by toggling the upper buckle and the lower buckle, the painting assembly 100 may be fixedly connected to the arm member of the distance measuring wheel or may be disassembled from the arm member of the distance measuring wheel. It should be understood that the fixing method can also be realized by quick release screws. In some embodiments, the upper buckle and/or the lower buckle include metal pins, and the driving device 140 is electrically connected to the distance measuring wheel through the metal pins, such that the distance measuring wheel supplies power to the driving device 140 through the metal pins. As such, the upper buckle and/or the lower buckle include metal pins. The driving device 140 is electrically connected to the distance measuring wheel through the metal pins, such that the distance measuring wheel can supply power to the driving device 140 through the metal pins. In this way, on one hand, the distance measuring wheel supplies power to the driving device 140 through the metal pins, that is, the painting assembly 100 may operate without an additional power supply module. On the other hand, in some embodiments, the communication device 150 may include the metal pins, and the metal pins are further configured to facilitate the paining assembly 100 connected to the distance measuring wheel to control a rotation angle of the concave cam 170 driven by the driving device 140. The rotation angle of the concave cam 170 will be described in more detail below.

Figure 3:
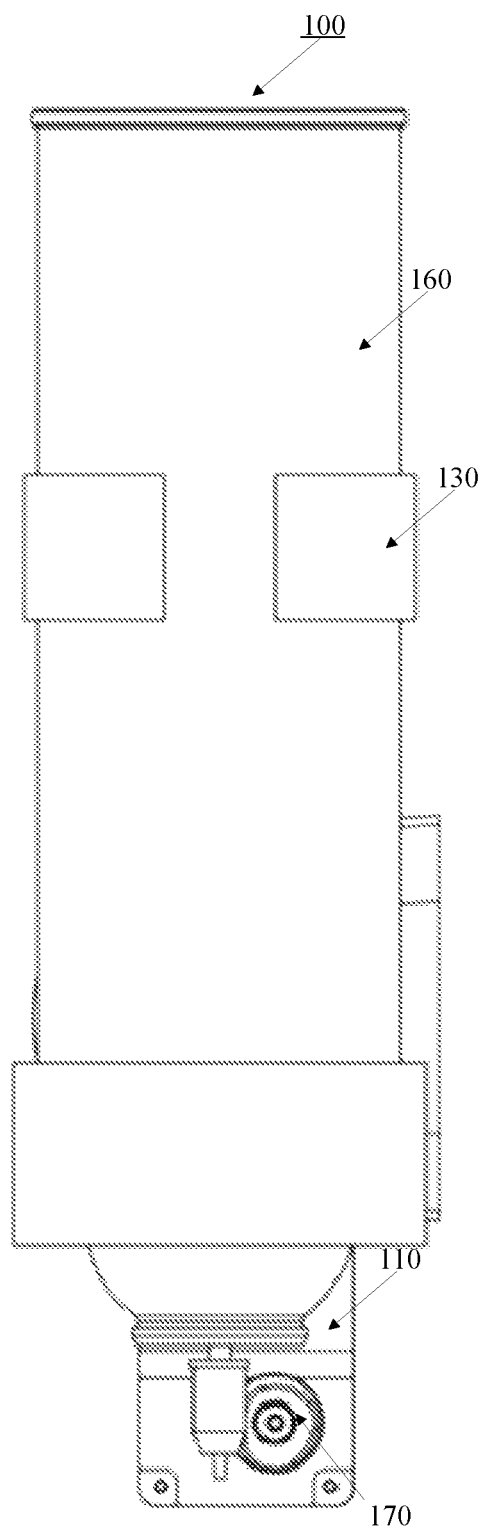
FIG. 3 is a side view of an exemplary painting assembly 100 for a distance measuring wheel according to some embodiments of the present disclosure.

The driving device 140 uses the control signal to control a nozzle of the paint can 160 fixed by the paint can fixing device 130, thereby achieving opening and closing of the nozzle and an opening extent of the nozzle. FIG. 3 is a side view of an exemplary painting assembly 100 for a distance measuring wheel according to some embodiments of the present disclosure. As shown in FIG. 3, the concave cam 170 abuts against the nozzle of the paint can 160 fixed by the paint can fixing device 130. The concave cam 170 is controlled by the driving device 140 to rotate to a specific rotation angle based on the control signal. The concave cam 170 rotates to the different rotation angles to control an opening extent of the nozzle of the paint can 160.

Correspondingly, the painting assembly 100 also includes the concave cam 170. The concave cam 170 is configured on a driving shaft of the driving device 140 to mechanically couple with the nozzle of the connected paint can 160 installed by the paint can fixing device 130, such that the rotation angle of the concave cam 170 corresponds to the opening extent of the nozzle. In this way, the rotation angle of the concave cam 170 may be made to correspond to the opening extent of the nozzle, such that the concave cam is driven to rotate the rotation angle by the driving device 140, thereby controlling the opening extent of the nozzle of the paint can 160 to control an amount of the paint sprayed and determining a thickness of the paint sprayed.

Further, in some embodiments, the communication device 150 may be, for example, a Bluetooth communication module. Those skilled in the art should understand that the Bluetooth communication module is merely exemplary and non-restrictive. Other modules capable of short-range wireless communication may also solve the technical problems that the disclosure intends to solve and achieve corresponding technical effects. For example, the other modules may include wireless communication modules such as a ZigBee communication module, an infrared communication module, a WiFi communication module, and so on. In some embodiments, the painting assembly 100 includes an independent power supply device thereof, such as a built-in rechargeable battery or a regular battery. In this way, the painting assembly 100 does not have to rely on the distance measuring wheel for power supply. Instead, the painting assembly 100 may include a separate and independent power supply device, thereby securing the power supply of the painting assembly 100.

Figure 4:
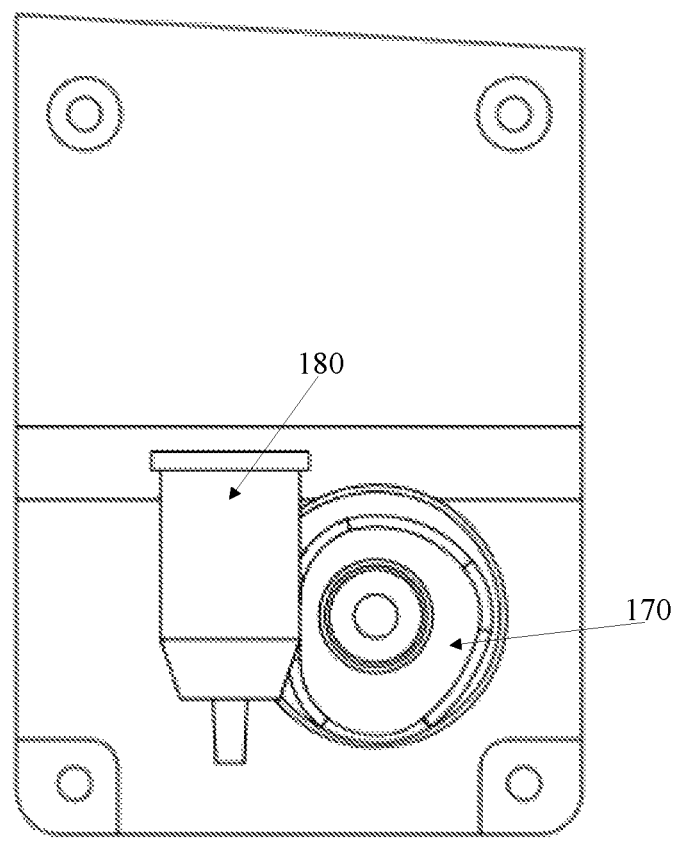
FIG. 4 is a first state diagram of coupling of a concave cam and a nozzle of an exemplary painting assembly 100 for a distance measuring wheel according to some embodiments of the present disclosure.
Figure 5:
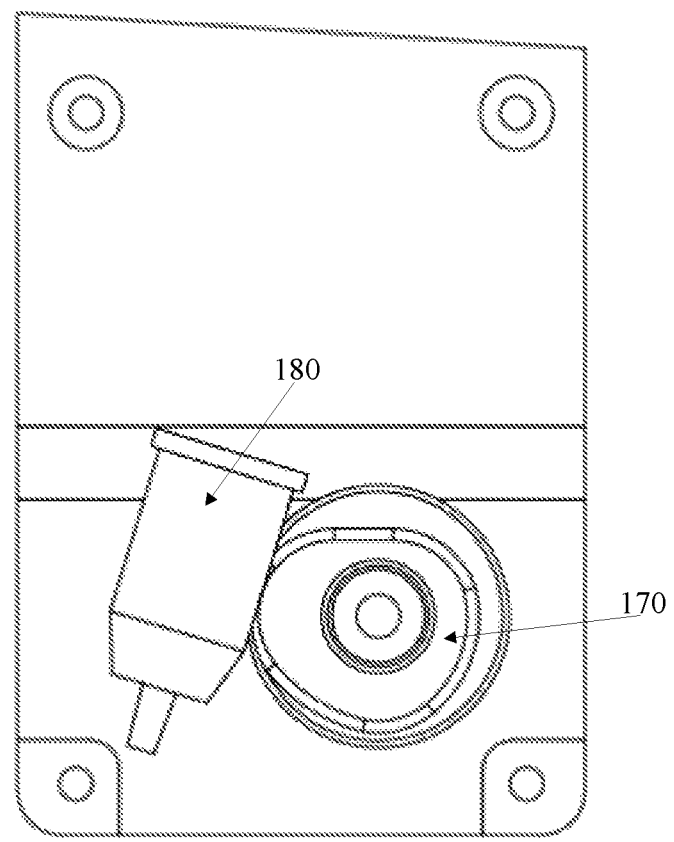
FIG. 5 is a second state diagram of coupling of a concave cam and a nozzle of an exemplary painting assembly 100 for a distance measuring wheel according to some embodiments of the present disclosure.
Figure 6:
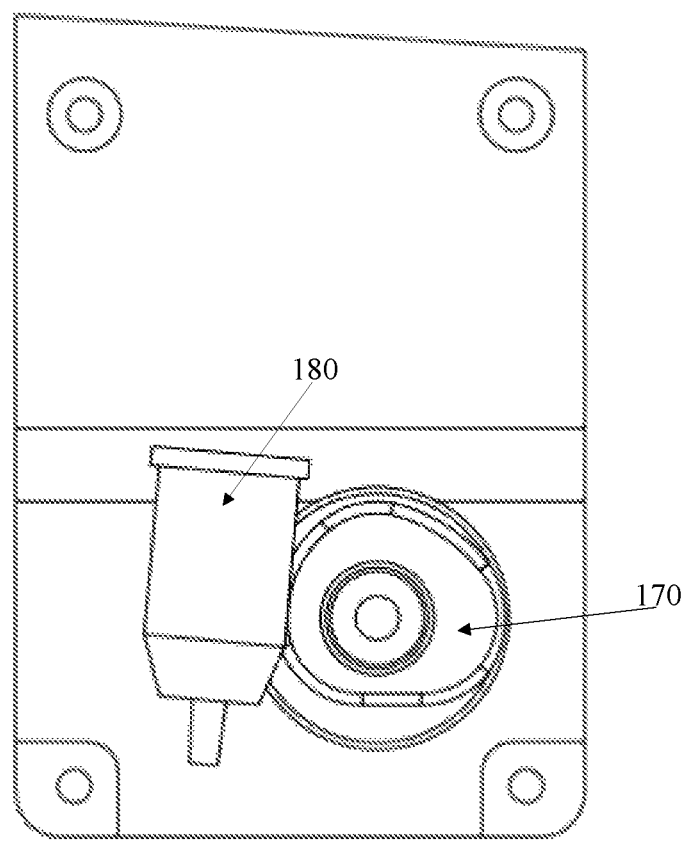
FIG. 6 is a third state diagram of coupling of a concave cam and a nozzle of an exemplary painting assembly 100 for a distance measuring wheel according to some embodiments of the present disclosure.

FIG. 4 is a first state diagram of coupling of a concave cam and a nozzle of an exemplary painting assembly 100 for a distance measuring wheel according to some embodiments of the present disclosure. As shown in FIG. 4, an axis of the concave cam 170 is closest to a nozzle 180. At this time, a position of the concave cam 170 corresponds to a closed position of the nozzle, and the rotation angle of the concave cam 170 is at a minimum value. FIG. 5 is a second state diagram of coupling of a concave cam and a nozzle of an exemplary painting assembly 100 for a distance measuring wheel according to some embodiments of the present disclosure. As shown in FIG. 5, the axis of the concave cam 170 is farthest away from the nozzle 180, and the position of the concave cam 170 is different from that in FIG. 4 and corresponds to a maximum opening position of the nozzle 180, and the rotation angle of the concave cam 170 is at a maximum value. FIG. 6 is a third state diagram of coupling of a concave cam and a nozzle of an exemplary painting assembly 100 for a distance measuring wheel according to some embodiments of the present disclosure. As shown in FIG. 6, the axis of the concave cam 170 is neither the nearest nor the farthest away from the nozzle 180. The concave cam 170 is located between the position in FIG. 4 and the position in FIG. 5, and is corresponding to an opening position within the maximum opening position of the nozzle, and the rotation angle of the concave cam 170 is at a value between the minimum value and the maximum value. In this way, it is possible to select or set the rotation angle of the concave cam 170 according to the amount of the paint sprayed, such that the rotation angle is within a range between the closed position (corresponding to the position in FIG. 4) and the maximum opening position (corresponding to the position in FIG. 5), thereby controlling a required amount of the paint sprayed.

Figure 7:
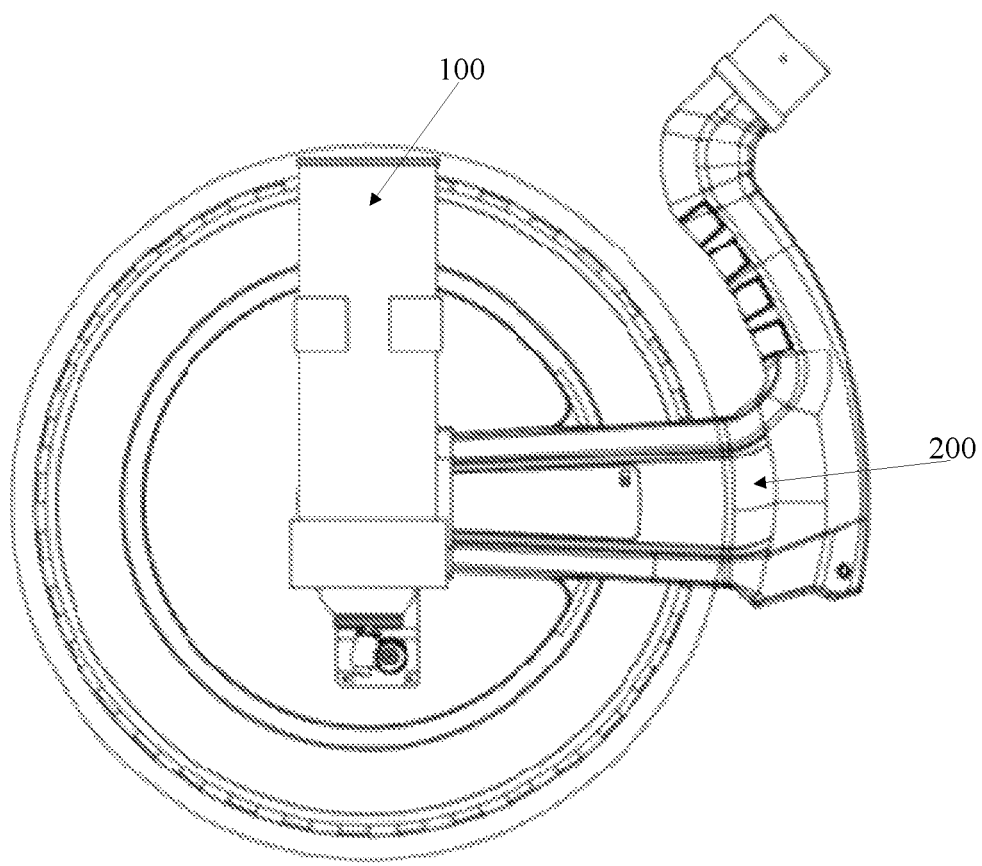
FIG. 7 is a schematic diagram of an exemplary distance measuring wheel 200 including a painting assembly 100 for distance measuring according to some embodiments of the present disclosure.

FIG. 7 is a schematic diagram of an exemplary distance measuring wheel 200 including a painting assembly 100 for distance measuring according to some embodiments of the present disclosure. As shown in FIG. 7, the distance measuring wheel 200 includes the previously described painting assembly 100. The distance measuring wheel 200 including the painting assembly 100 supports a painting function. By introducing the painting assembly 100 for the distance measuring wheel 200, the driving device 140 may be controlled by the control signal received through the communication device 150. The paint spraying state of the paint can 160 connected with the paint can fixing device 130 felicitates painting the predetermined pattern. In some embodiments, the distance measuring wheel 200 further includes a communication module (not shown). The communication module is configured to send the control signal to the painting assembly 100. The distance measuring wheel 200 provided by the present disclosure includes the communication module 150 that sends the control signal to the painting assembly 100, such that the distance measuring wheel 200 controls the amount of the paint sprayed by the painting assembly 100. In some embodiments, the distance measuring wheel 200 further includes an image acquisition device (not shown). In this way, the distance measuring wheel 200 includes the image acquisition device, such that the distance measuring wheel 200 acquires images such as real scenes and enables subsequent guidance of painting by, for example, augmented reality (AR). In some embodiments, the distance measuring wheel 200 further includes a display device (not shown). In such a manner, the distance measuring wheel 200 may, for example, display the required paint pattern in real time, and may also display a combination of the real scene and the paint pattern. Further, the painting assembly 100 and the distance measuring wheel 200 including the painting assembly 100 provided by the present disclosure uses the control signal received through the communication device 150 to control the driving device 140, and to control the paint spraying state of the paint can 160, thereby facilitating painting the predetermined pattern.

In addition, as show in FIG. 7, the nozzle 180 of the paint can 160 installed on the paint can fixing device 130 is aligned with a center line of the arm member of the distance measuring wheel 200 connected with the painting assembly 100. However, those skilled in the art should understand that the alignment of the nozzle 180 of the paint can 160 installed on the paint can fixing device 130 with the arm member of the distance measuring wheel 200 connected to the painting assembly 100 does not necessarily require that the painting assembly 100 be installed at the center of the distance measuring wheel 200. The painting assembly 100 may also be installed off-center and close to a side of a bracket of the distance measuring wheel 200, as long as the sprayed paint can be sprayed onto an attachment at a contact point between the arm member of the distance measuring wheel 200 and the ground. As such, a route sprayed by the painting assembly 100 may be consistent with a route of the distance measuring wheel 200 attached thereto, such that the route sprayed by the painting assembly 100 can be planned according to a travel route of the distance measuring wheel 200.

A method of performing a paint spraying process using the painting assembly coupled with the distance measuring wheel is described in detail below.

Figure 8:
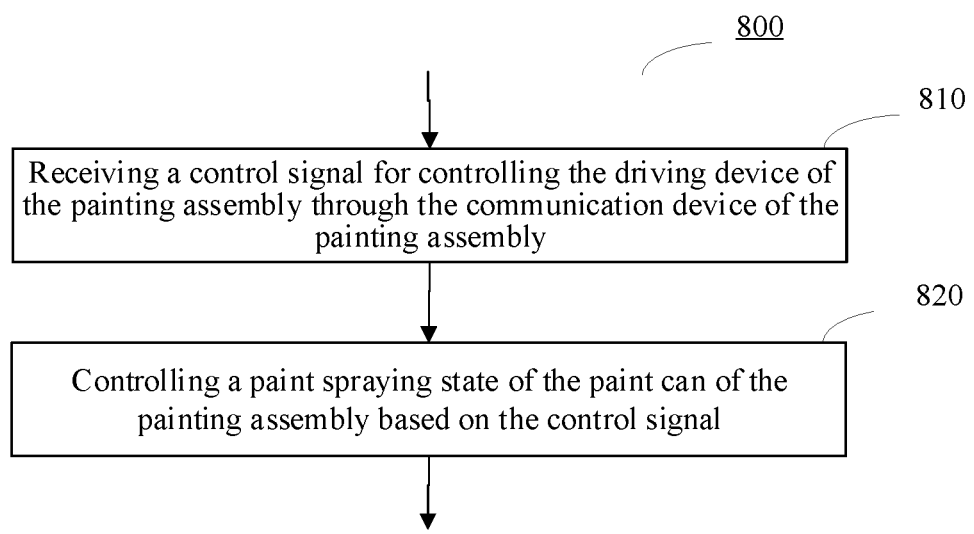
FIG. 8 is a flowchart of an exemplary method 800 of spraying paint using a painting assembly coupled to the distance measuring wheel according to some embodiments of the present disclosure.

FIG. 8 is a flowchart of an exemplary method 800 of spraying paint using a painting assembly coupled to the distance measuring wheel according to some embodiments of the present disclosure. As shown in FIG. 8, the method 800 of spraying the paint using the painting assembly coupled with the distance measuring wheel includes the following processes.

At 810, a control signal for controlling the driving device 140 of the painting assembly 100 through the communication device 150 of the painting assembly 100 is received.

At 820, a paint spraying state of the paint can 160 of the painting assembly 100 is controlled based on the control signal.

In other words, a main control unit controls the driving device 140 through an electrical connection, and the driving device 140 uses a transmission member of the painting assembly 100 to control a switch bearing of the transmission member such as the concave cam 170 to rotate, thereby achieving an effect of switching on and off the paint spraying.

In the process, an application program running on a smart mobile device such as a mobile phone or a tablet computer transmits a control signal to the main control unit disposed on the painting assembly 100 or the distance measuring wheel 200 through a Bluetooth interface, thereby performing an advanced painting function.

Various painting schemes described below may be implemented based on the painting function.

Embodiment One: Dotted Line Paint Spraying

The application program running on the smart mobile device may pre-configure a dotted line. During a progress of using the distance measuring wheel 200, the application program may obtain a distance traveled by the distance measurement wheel 200 through the Bluetooth interface. Based on a combination of a currently-traveled distance and the pre-configured dotted line, the method turns on and off the paint spraying in real time to achieve a dotted line painting effect matching the pre-configured dotted line.

Embodiment Two: Specific Pattern Paint Spraying

Figure 9:
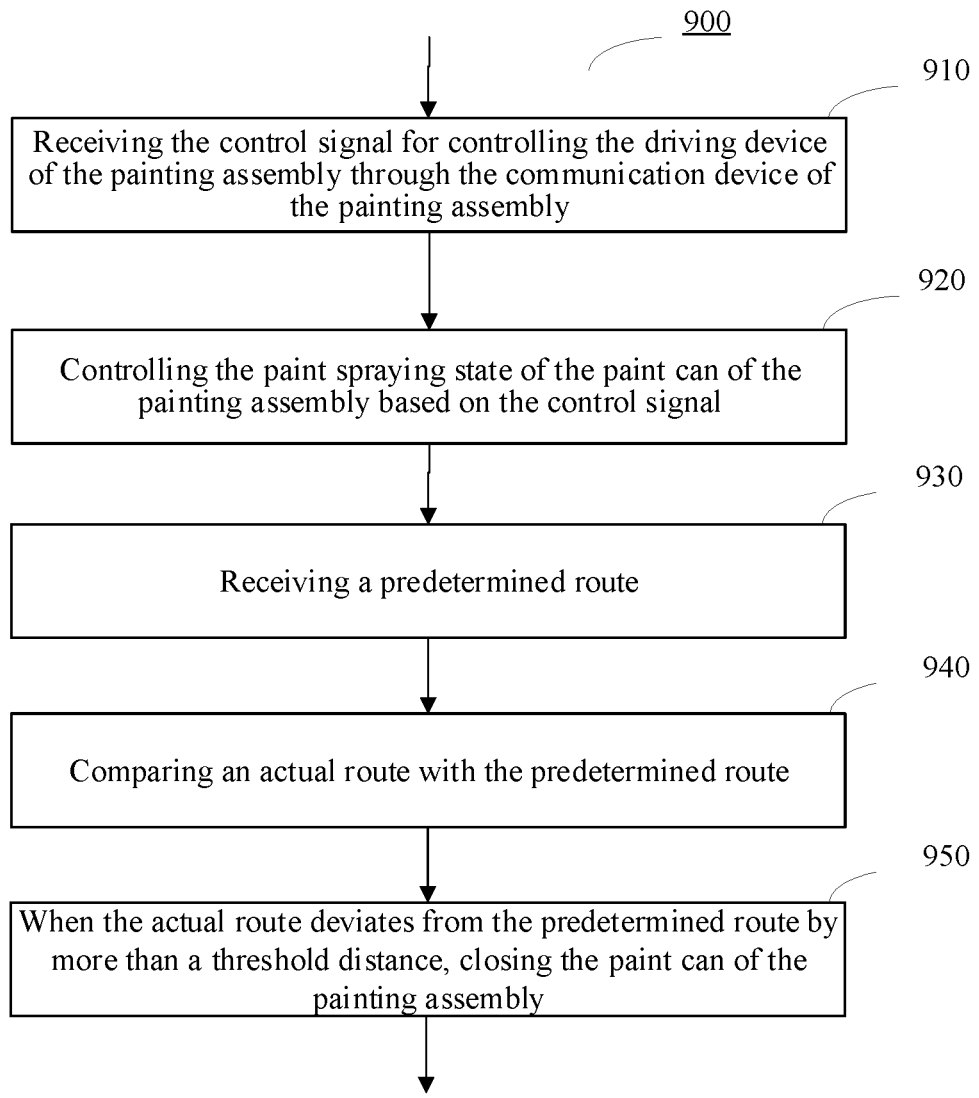
FIG. 9 is a flowchart of another exemplary method 900 for spraying paint with a painting assembly coupled to the distance measuring wheel according to some embodiments of the present disclosure.

The application program pre-configures specific graphics in conjunction with a guidance function of the distance measuring wheel 200 to spray paint patterns, such as traffic signs and the like. When a track of the distance measuring wheel 200 deviates from the pre-configured pattern, the application program automatically identifies an error, and stops spraying the paint pattern. FIG. 9 is a flowchart of another exemplary method 900 for spraying paint with a painting assembly coupled to the distance measuring wheel according to some embodiments of the present disclosure. As shown in FIG. 9, the method 900 for spraying paint with the painting assembly coupled to the distance measuring wheel includes the following processes. At 910, the control signal for controlling the driving device of the painting assembly is received through the communication device of the painting assembly. At 920, the paint spraying state of the paint can of the painting assembly is controlled based on the control signal. At 930, a predetermined route is received. At 940, an actual route is compared with the predetermined route. At 950, when the actual route deviates from the predetermined route by more than a threshold distance, the paint can of the painting assembly is closed. Those skilled in the art should understand that it is not completely impossible to have a deviation. For example, the deviation is allowed when the deviation is less than 1 cm. In this case, the threshold distance is 1 cm. Of course, the threshold distance may be set according to a size of the pattern to be painted. For example, the pattern to be painted is a zebra crossing pattern with an area of 20 square meters. In this case, the threshold distance may be set to a large deviation value, such as 5 cm. This makes it possible to not spray paint when the path deviates, thereby avoiding the spraying of undesired patterns. In some embodiments, warning information may also be output when the actual route deviates from the predetermined route by more than the threshold distance.

In addition, the method provided by the present disclosure uses the painting assembly connected with the distance measuring wheel to spray the paint and also achieves environment protection objective in the painting process. The application program may turn off the paint spraying to save raw materials when the distance measuring wheel stops.

Figure 10:
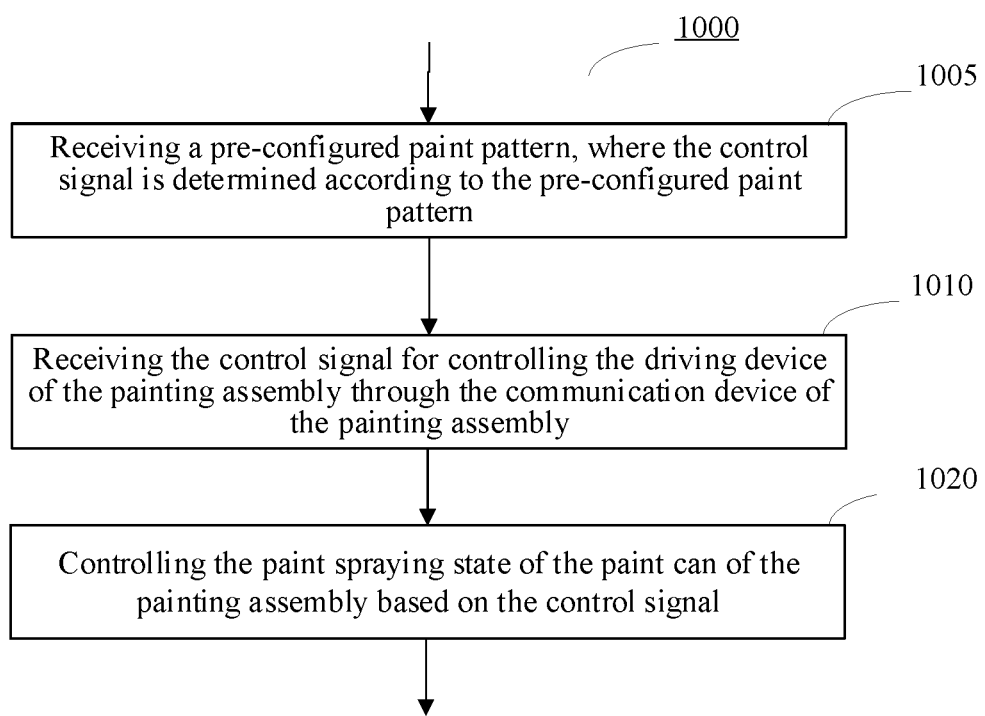
FIG. 10 is a flowchart of another exemplary method 1000 for paint spraying with a painting assembly coupled to the distance measuring wheel according to some embodiments of the present disclosure.

FIG. 10 is a flowchart of another exemplary method 1000 for paint spraying with a painting assembly coupled to the distance measuring wheel according to some embodiments of the present disclosure. As shown in FIG. 10, the method 1000 for paint spraying with the painting assembly coupled to the distance measuring wheel includes the following processes. At 1005, a pre-configured paint pattern is received, where the control signal is determined according to the pre-configured paint pattern. At 1010, the control signal for controlling the driving device of the painting assembly is received through the communication device of the painting assembly. At 1020, the paint spraying state of the paint can of the painting assembly is controlled based on the control signal. As such, the pre-configured paint pattern can be painted, such that the pre-configured paint pattern can be painted in the actual scene. The pre-configured paint pattern may be a pattern on a predetermined route, or may be, for example, a pattern in an actual scene, such as a tire track at a car accident scene. Further, the application program may also calculate and display the amount of paint sprayed in real time according to the distance that has been painted. According to a preset capacity of each can of spray paint, the remaining spray paint volume can be displayed in real time. According to a spray paint price and complexity of the graphics, a project cost can be estimated.

Embodiment Three: AR Painting Preview and Guidance

The AR function of the application program may display an effect after paint spraying in real time on the mobile phone application program in real time, and guide graphics drawing in an AR scene.

Generally, in some embodiments, the pre-configured paint pattern includes at least one of the following: points, solid lines, dashed lines, dash-dotted lines, straight lines, or curves including a specified pattern. In some embodiments, the specified pattern may include a ground traffic sign. In some embodiments, the method further includes: connecting the painting assembly to the distance measuring wheel through a connecting device of the painting assembly.

In some embodiments, the method further includes: determining whether a distance between the distance measuring wheel and a point is less than a first predetermined distance and controlling a reminder device to generate a reminder sound at a first frequency in response to the distance being less than the first predetermined distance; and determining whether the distance between the distance measuring wheel and the point is less than a second predetermined distance and controlling the reminder device to send the reminder sound at a second frequency in response to the distance being less than the second predetermined distance. The first predetermined distance is greater than the second predetermined distance and the first frequency is lower than the second frequency. In some embodiments, the method further includes: when the distance measuring wheel reaches a position of the point and stays at the point for a predetermined time, the painting assembly paints the point. Thus, a user of the distance measuring wheel is reminded of the distance to a predetermined point, thereby improving the efficiency of painting such a point. Further, a mis-operation can be avoided by staying for the predetermined time.

For example, the application program may be connected to the painting assembly and the distance measuring wheel through Bluetooth. In addition, the application program may set a style of drawing points (lines) and a distance interval of the points (lines) through a human machine interface (HMI). The style includes: drawing dots and dotted lines. Further, the application program may control the painting assembly to draw the corresponding points (lines) by obtaining distance data of the distance measuring wheel.

When a point drawing mode is turned on, the user sets a target point interval through the HMI, and the setting may be executed periodically. In one example, the target point interval is set to be less than 2 m. When a distance between the target point position and the current position of the distance measuring wheel is less than 0.5 m, the reminder device such as a buzzer may sound intermittently. When the distance between the target point position and the position of the distance measuring wheel is less than plus or minus 2 cm, the buzzer may sound continuously. In another example, the target point interval is set to be greater than or equal to 2 m. When the distance between the target point position and the current position of the distance measuring wheel is less than 1.0 m, the reminder device such as the buzzer may sound intermittently. When the distance between the target point position and the position of the distance measuring wheel is less than plus or minus 2 cm, the buzzer may sound continuously.

In addition, when the buzzer sounds continuously (reaching the target distance), the distance measuring wheel needs to pause on the spot for 1s. At this time, the application program controls the painting assembly to complete the drawing operation and turns off the buzzer. If the user continues to push and the distance measuring wheel does not pause on the spot for 1s, the painting assembly will not perform any operation. If the user goes back to the target point position, the buzzer will sound continuously again. At this time, if the distance measuring wheel pauses on the spot for 1s, the painting operation will be performed. If the distance measuring wheel does not stop, no operation will be performed.

When a dotted line drawing mode is turned on, the user sets a target line length and interval through the HMI, and the setting may be executed periodically. The buzzer may not sound during the process, and the user can keep pushing the distance measuring wheel. If the distance measuring wheel pauses at any time or any position, the application program may turn off the painting assembly until the distance measuring wheel is pushed again.

In some embodiments, the method further includes: determining a movement state of the distance measuring wheel; and turning off the paint can of the painting assembly when the distance measuring wheel stops. In some embodiments, the method further includes: determining the movement state of the distance measuring wheel; and when the distance measuring wheel starts to rotate and the distance measuring wheel is located at a predetermined painting position, the paint can of the painting assembly is automatically turned on. In other words, when the distance measuring wheel starts to rotate again, the painting assembly may determine whether the position of the distance measuring wheel is at the predetermined painting position. If so, the painting assembly automatically turns on the paint can of the painting assembly, thereby improving usability and user experience. In some embodiments, the method further includes: determining the control signal based on the amount of remaining paint in the paint can of the painting assembly. For example, assuming that the spray paint thickness is 1 mm, but the remaining amount of the paint in the paint can of the painting assembly is not enough. The control signal may be proportionally lowered such that the spray paint thickness is reduced to achieve the objective of completing the spray paint pattern. In some embodiments, the method further includes: determining the control signal based on a travel speed of the distance measuring wheel coupled to the painting assembly. In some embodiments, the painting assembly further includes a transmission member. Preferably, the transmission member may be, for example, a flywheel or a concave cam. At this time, the method further includes: controlling the paint spraying state of the paint can of the painting assembly through the transmission member based on the control signal. The transmission member is mechanically coupled to the nozzles of the paint can and different rotation angles of the transmission member correspond to different opening extents of the nozzle. In some embodiments, the method further includes: determining the control signal based on augmented reality technology. For example, an image of the real scene is obtained in real time through a camera associated with the distance measuring wheel, and information of the preset spray paint pattern is also available. At this time, the preset paint spray pattern can be displayed over the real scene through the augmented reality technology. The control signal is determined based on a real-time position of the distance measuring wheel to realize or draw the preset paint spray pattern in the real scene. In some embodiments, the method further includes: determining the control signal according to the route to be painted, time, and a capacity of the paint can of the painting assembly. For example, when the capacity of the paint can of the painting assembly is relatively large, for example, 2 L, the paint spray pattern may be sprayed thicker accordingly. In other words, the determined control signal makes the opening extent of the nozzle appropriately large. On the contrary, when the capacity of the paint can of the painting assembly is relatively small, for example, 1 L, the paint spray pattern may be sprayed thinner accordingly. In other words, the determined control signal makes the opening extent of the nozzle appropriately smaller. In some embodiments, the method further includes: calculating and displaying the remaining capacity of the paint can based on the amount of paint that has been painted.

Figure 11:
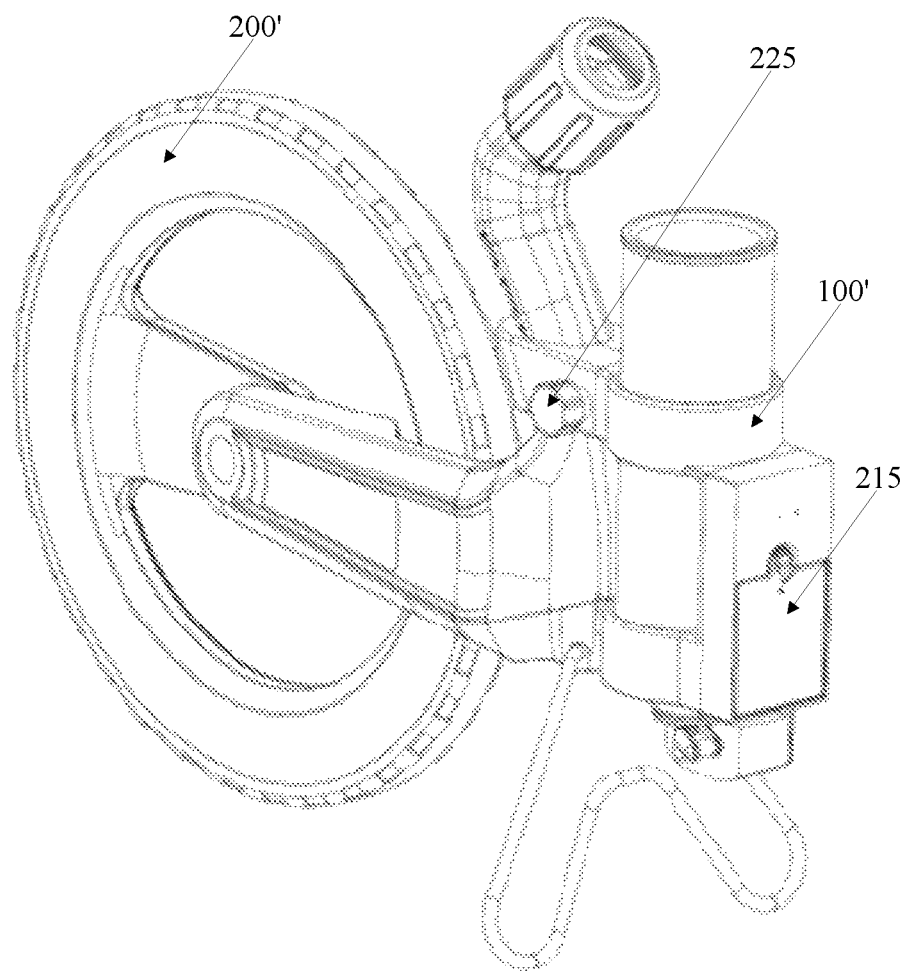
FIG. 11 is an assembled view of an exemplary painting assembly 1100 for a distance measuring wheel according to some embodiments of the present disclosure.

FIG. 11 is an assembled view of an exemplary painting assembly 1100 for a distance measuring wheel according to some embodiments of the present disclosure. As shown in FIG. 11, the difference from FIG. 1 is that the painting assembly 100' is not mounted at the front in a traveling direction of the distance measuring wheel, but is mounted at the rear in the traveling direction of the distance measuring wheel. As shown in FIG. 11, the nozzle of the paint can is located in a plane where a radial direction of the distance measuring wheel coupled with the painting assembly is located. In other words, the nozzle of the paint can is located in a same plane as a radial direction of the wheel member of the distance measuring wheel. Based on a method of mounting the painting assembly, since there is a certain distance from a start/end point of a wheel of the distance measuring wheel, distance compensation is required. The distance compensation may be performed automatically by an algorithm. Compared with the embodiment in FIG. 1, the painting assembly of the embodiment in FIG. 11 is assembled in a plane where the distance measuring wheel rolls such that a painting track is consistent with a traveling track of the distance measuring wheel while for the distance measuring wheel in FIG. 1, the painting track is parallel to the traveling track, and each has its own advantages. Those skilled in the art should understand that the nozzle of the paint can is located in a plane where a radial direction of the distance measuring wheel coupled with the painting assembly is located. As long as the nozzle is located within any radial plane on the thickness of the roller, any material sprayed from the nozzle is ensured to fall on a wheel track of the distance measuring wheel, thereby ensuring a desired drawing effect.

As shown in FIG. 11, the transmission member may be the concave cam shown in FIG. 1, or a flywheel. One or more transmission members may cooperate with each other, or may be a combination of other transmission modes.

In addition, as shown in FIG. 11, the painting assembly 100' is mounted on the distance measuring wheel 200' through quick release screws 225. As such, the painting assembly 100' can quickly mounted on the distance measuring wheel 200', thereby ensuring reliability of the mounting method. In addition, as shown in FIG. 11, the painting assembly 100' includes an independent power supply module, and the independent power supply module includes a battery cover 215. Thus, the painting assembly 100' is powered by the independent power supply module without relying on the distance measuring wheel 200' for power supply, and the reliability of the painting assembly is improved.

Figure 12:
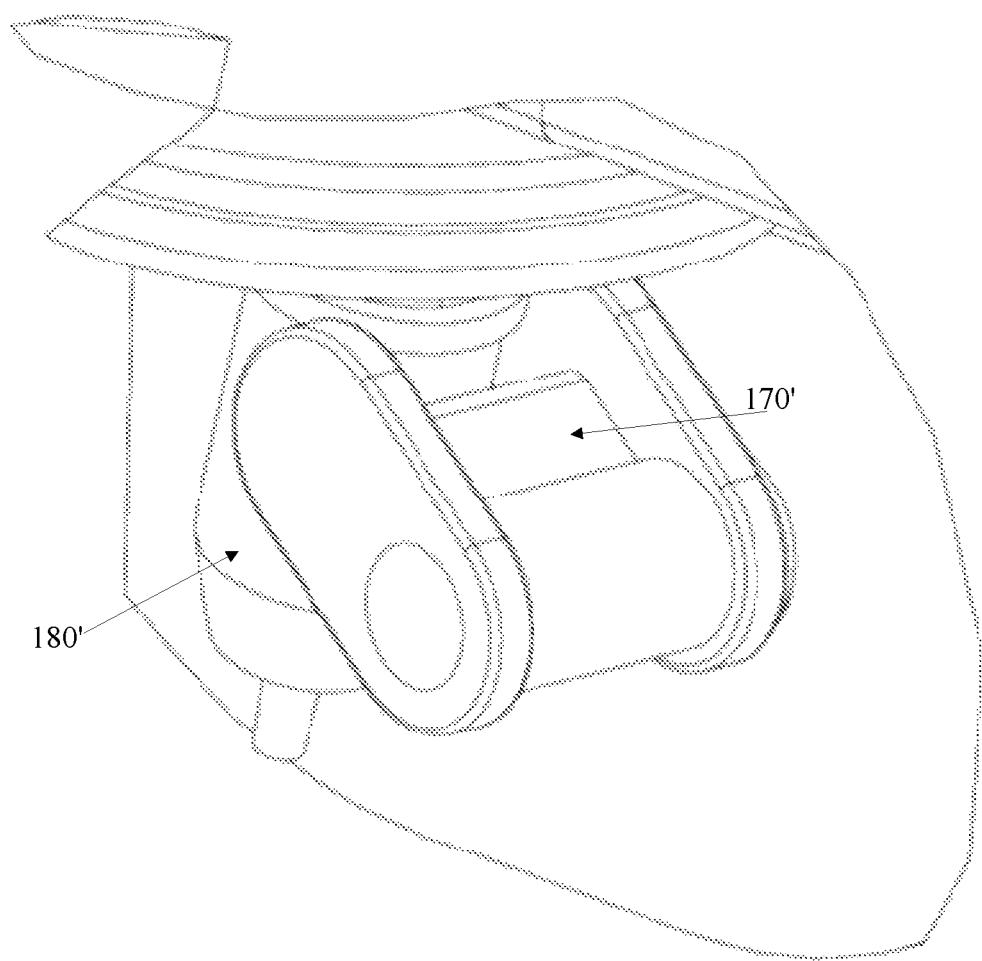
FIG. 12 is an enlarged partial view of an exemplary painting assembly for a distance measuring wheel according to some embodiments of the present disclosure.

FIG. 12 is an enlarged partial view of an exemplary painting assembly for a distance measuring wheel according to some embodiments of the present disclosure. As shown in FIG. 12, the driving device drives a pressing plate 170', and the pressing plate 170' presses the nozzle 180' of the paint can. An amount of the pressure pressed by the pressing plate 170' corresponds to the opening extent of the nozzle, such that the amount of the paint sprayed is controlled through the control signal.

In the embodiments of the present disclosure, the painting assembly is coupled with the distance measuring wheel. The painting assembly is controlled by the control signal received through the communication device to control the driving device. The driving device controls the paint spraying state of the paint can, thereby facilitating spray painting the preset pattern.

Although various embodiments of the present disclosure have been described, it would be apparent to those skilled in the art that various changes and modifications can be made without departing from the scope and spirit of the present disclosure. One or some of the advantages of the present disclosure are realized in the context of the scope. Other components performing the same function may be appropriately substituted for those skilled in the art. It shall be understood that features explained herein with reference to a particular drawing may be combined with features of other drawings, even in those cases where this is not explicitly mentioned. Further, the methods provided by the embodiments of the present disclosure can be implemented either in all software implementations using appropriate processor instructions or in hybrid implementations utilizing a combination of hardware logic and software logic to achieve the same results. Such modifications to the embodiments according to the present disclosure are intended to be covered by the appended claims.

What is claimed is:

1. A painting assembly for a distance measuring wheel, comprising:
   a main body;
   a connecting device disposed on the main body and configured to connect the paining assembly to an arm member of the distance measuring wheel;
   a paint can fixing device disposed on the main body and configured to fix a paint can installed to the painting assembly;
   a communication device configured to receive a control signal for controlling a driving device; and
   the driving device connected to the main body and configured to: in response to the control signal, control a paint spraying state of the paint can.

2. The painting assembly according to claim 1, wherein:
   a nozzle of the paint can is aligned with a center line of a wheel member of the distance measuring wheel coupled with the painting assembly.

3. The painting assembly according to claim 1, wherein:
   the nozzle of the paint can is located in a same plane as a radial direction of the wheel member of the distance measuring wheel.

4. The painting assembly according to claim 1, further comprising:
   a transmission member mechanically coupled with the nozzle of the paint can and configured to rotate to different positions when driven by the driving device, wherein a position of the transmission member corresponds to an opening extent of the nozzle.

5. The painting assembly according to claim 4, wherein:
   the transmission member at a first position corresponds to a closed position of the nozzle.

6. The painting assembly according to claim 5, wherein:
   the transmission member at a second position corresponds to a maximum opening position of the nozzle, the second position being different from the first position.

7. The painting assembly according to claim 6, wherein:
   the transmission member at a position between the first position and the second position corresponds to an opening extent of the nozzle smaller than the maximum opening position of the nozzle.

8. The painting assembly according to claim 4, wherein:
   the transmission member includes a concave cam or a flywheel.

9. The painting assembly according to claim 1, wherein:
   the connecting device includes an upper buckle and a lower buckle; and
   the upper buckle and the lower buckle are disposed on the main body and configured to fixedly connect the painting assembly to the arm member of the distance measuring wheel.

10. The painting assembly according to claim 9, wherein:
    the upper buckle and/or the lower buckle include one or more metal pins; and
    the driving device is electrically connected to the distance measuring wheel through the one or more metal pins, such that the distance measuring wheel supplies power to the driving device through the one or more metal pins.

11. The painting assembly according to claim 10, wherein:
    the communication device includes one or more metal pins; and
    the one or more metal pins are configured to facilitate the distance measuring wheel coupled with the painting assembly to control a rotation angle rotated by the driving device.

12. The painting assembly according to claim 1, wherein:
    the communication device is a Bluetooth communication module.

13. The painting assembly according to claim 1, further comprising:
    a power supply module.

14. A distance measuring wheel having a paint spraying function, comprising:
    a painting assembly including:
       a connecting device disposed on the main body and configured to connect the paining assembly to an arm member of the distance measuring wheel;
       a paint can fixing device disposed on the main body and configured to fix a paint can installed to the painting assembly;
       a communication device configured to receive a control signal for controlling a driving device; and
       the driving device connected to the main body and configured to: in response to the control signal, control a paint spraying state of the paint can.

15. The distance measuring wheel according to claim 14, further comprising:
    a communication module configured to send a control signal to the painting assembly.

16. The distance measuring wheel according to claim 14, further comprising:
    an image acquisition device.

17. The distance measuring wheel according to claim 14, further comprising:
a display device.

18. The distance measuring wheel according to claim 14, wherein:
a nozzle of the paint can is aligned with a center line of a wheel member of the distance measuring wheel coupled with the painting assembly.

19. The distance measuring wheel according to claim 14, wherein:
the nozzle of the paint can is located in a same plane as a radial direction of the wheel member of the distance measuring wheel.

20. The distance measuring wheel according to claim 14, wherein:
the painting assembly further includes a transmission member mechanically coupled with the nozzle of the paint can, configured to rotate to different positions when driven by the driving device, wherein a position of the transmission member corresponds to an opening extent of the nozzle.

\* \* \* \* \*